US007908852B2

(12) United States Patent
Zhang et al.

(10) Patent No.: US 7,908,852 B2
(45) Date of Patent: Mar. 22, 2011

(54) CONTROL SYSTEM FOR RECOVERING SWING MOTOR KINETIC ENERGY

(75) Inventors: Jiao Zhang, Naperville, IL (US); Pengfei Ma, Naperville, IL (US); Michael R. Schwab, Crest Hill, IL (US); Tonglin Shang, Bolingbrook, IL (US); Kalpesh N. Patel, Romeoville, IL (US)

(73) Assignees: Caterpillar Inc., Peoria, IL (US); Caterpillar S.A.R.L., Geneva (CH)

( * ) Notice: Subject to any disclaimer, the term of this patent is extended or adjusted under 35 U.S.C. 154(b) by 413 days.

(21) Appl. No.: 12/039,426

(22) Filed: Feb. 28, 2008

(65) Prior Publication Data

US 2009/0217653 A1 Sep. 3, 2009

(51) Int. Cl.
*F16D 31/02* (2006.01)
*F15B 13/04* (2006.01)

(52) U.S. Cl. ............................... 60/414; 60/468; 91/454

(58) Field of Classification Search .................... 60/413, 60/414, 464, 468, 493; 91/454, 457
See application file for complete search history.

(56) References Cited

U.S. PATENT DOCUMENTS

| | | | |
|---|---|---|---|
| 4,528,892 | A | 7/1985 | Okabe et al. |
| 4,586,332 | A | 5/1986 | Schexnayder |
| 4,693,080 | A | 9/1987 | Van Hooff |
| 4,707,993 | A | 11/1987 | Kime |
| 5,794,437 | A | 8/1998 | Lisniansky |
| 5,794,438 | A | 8/1998 | Lisniansky |
| 5,794,441 | A | 8/1998 | Lisniansky |
| 5,916,139 | A | 6/1999 | Tieben |
| 6,005,360 | A | 12/1999 | Pace |
| 6,009,708 | A | 1/2000 | Miki et al. |
| 6,378,301 | B2 | 4/2002 | Endo et al. |
| 6,460,332 | B1 | 10/2002 | Maruta et al. |
| 6,725,581 | B2 | 4/2004 | Naruse et al. |
| 6,854,268 | B2 * | 2/2005 | Fales et al. ...................... 91/454 |
| 7,086,226 | B2 | 8/2006 | Oguri |
| 7,201,095 | B2 | 4/2007 | Hughey |
| 2005/0279088 | A1 | 12/2005 | Kim |

FOREIGN PATENT DOCUMENTS

| | | |
|---|---|---|
| JP | 2004125094 | 4/2004 |
| KR | 20000021946 | 4/2000 |
| KR | 20050090816 | 9/2005 |

* cited by examiner

*Primary Examiner* — Michael Leslie
(74) *Attorney, Agent, or Firm* — Leydig, Voit & Mayer

(57) ABSTRACT

This disclosure relates to a hydraulic system and method that converts the kinetic energy generated by the operation of a swing motor into hydraulic potential energy and reuses the hydraulic potential energy for swing motor acceleration. An accumulator can be provided for storing exit oil from the swing motor that is pressurized by the inertia torque applied on the moving motor via movement of an upper structure of a machine. The pressurized oil in the accumulator can be reused to accelerate the swing motor by supplying pressurized oil to the swing motor.

19 Claims, 2 Drawing Sheets

CONTROL SYSTEM FOR RECOVERING SWING MOTOR KINETIC ENERGY

TECHNICAL FIELD

This patent disclosure relates generally to a hydraulic swing motor control circuit for an excavator or the like and, more particularly, to a hydraulic swing motor control circuit for recovering kinetic energy from the swing motor.

BACKGROUND

Certain types of machines, such as an excavator, for example, include a swing mechanism which enables an upper structure to be rotated about a base machine on a central pivot by a hydraulic swing motor. The hydraulic swing motor is part of a hydraulic circuit that includes a directional control valve configured to control the swing motor. The large mass and geometry of the upper structure of the machine create high inertial loads when the upper structure is rotated.

Many devices have been employed in the hydraulic circuit of such machines to prevent or reduce the inertia-induced hydraulic shock loads on the various parts of the machine and the hydraulic circuit. One such example is disclosed in U.S. Pat. No. 4,586,332, which issued on May 6, 1986, to Lawrence F. Schexnayder. The hydraulic swing motor control circuit described in the '332 patent includes a pair of shunt valves each of which establishes restricted communication between first and second motor conduits leading to the hydraulic swing motor in a particular direction at their normal spring-biased position. This allows limited free swing of the upper structure when the directional control valve is shifted from an operating position to the neutral position. Shifting the directional control valve to an operating position causes an appropriate one of the shunt valves to shift to a blocking position so that no interconnection between the motor conduits exists. The present disclosure is directed to improving machine productivity and fuel efficiency through the swing motor operation.

SUMMARY

The disclosure describes, in one aspect, a method and a system for controlling a swing motor that recovers kinetic energy generated by the operation of the swing motor, converts the kinetic energy recovered from the swing motor into hydraulic potential energy, and reuses the hydraulic potential energy converted from the kinetic energy recovered from the swing motor for swing motor acceleration.

In an aspect of the disclosure, a control circuit includes a pump, a swing motor, first and second motor conduits, and an accumulator system. The swing motor has a first port and a second port. The swing motor moves in a first direction when a flow of hydraulic fluid flows into the swing motor through the first port. The swing motor moves in a second direction when a flow of hydraulic fluid flows into the swing motor through the second port with the second direction being opposite to the first direction. The first motor conduit is connected to the first port of the motor, and the second motor conduit is connected to the second port of the motor. The accumulator system includes a pressure-controlled selection valve and an accumulator. The selection valve is hydraulically connected to the first and second motor conduits and to the accumulator. The selection valve is moveable between a first open position, wherein a flow path between the first port of the swing motor and the accumulator is defined, and a second open position, wherein a flow path between the second port of the swing motor and the accumulator is defined. The selection valve is disposed in the first open position when the pressure in the first motor conduit is greater than the pressure in the second motor conduit and disposed in the second open position when the pressure in the second motor conduit is greater than the pressure in the first motor conduit.

In another aspect of the disclosure, a method for controlling a swing motor includes directing a flow of hydraulic fluid through a first motor conduit into a first port of the swing motor and out of a second port of the swing motor into a second motor conduit to move the swing motor in a first direction. The flow of hydraulic fluid through the swing motor into the first port and out the second port can be decelerated. A flow path can be provided from the second port of the swing motor to an accumulator such that at least a portion of the flow of hydraulic fluid exiting the swing motor from the second port is directed into the accumulator.

DETAILED DESCRIPTION

This disclosure relates to a hydraulic system and method for recovering the kinetic energy generated by the operation of a swing motor, converting the kinetic energy into hydraulic potential energy, and reusing the hydraulic potential energy for swing motor acceleration to improve the machine productivity and fuel efficiency of the overall system. The hydraulic system includes an accumulator for collecting kinetic energy caused by the motion of the swing motor. The accumulator stores exit oil from the swing motor that is pressurized by the inertia torque applied on the moving motor via movement of an upper structure of the machine, such as an excavator. The swing motor deceleration can be dependent upon the accumulator.

The supply of pressurized oil in the accumulator can be reused to accelerate the swing motor by supplying pressurized oil to the selected motor port. The accumulator can be connected to the swing motor in parallel with the hydraulic pump that operates the swing motor for turbo-charging the swing motor. A pressure-controlled selector valve can be included to ensure that the accumulator is connected to the appropriate side of the swing motor.

Figure 1:
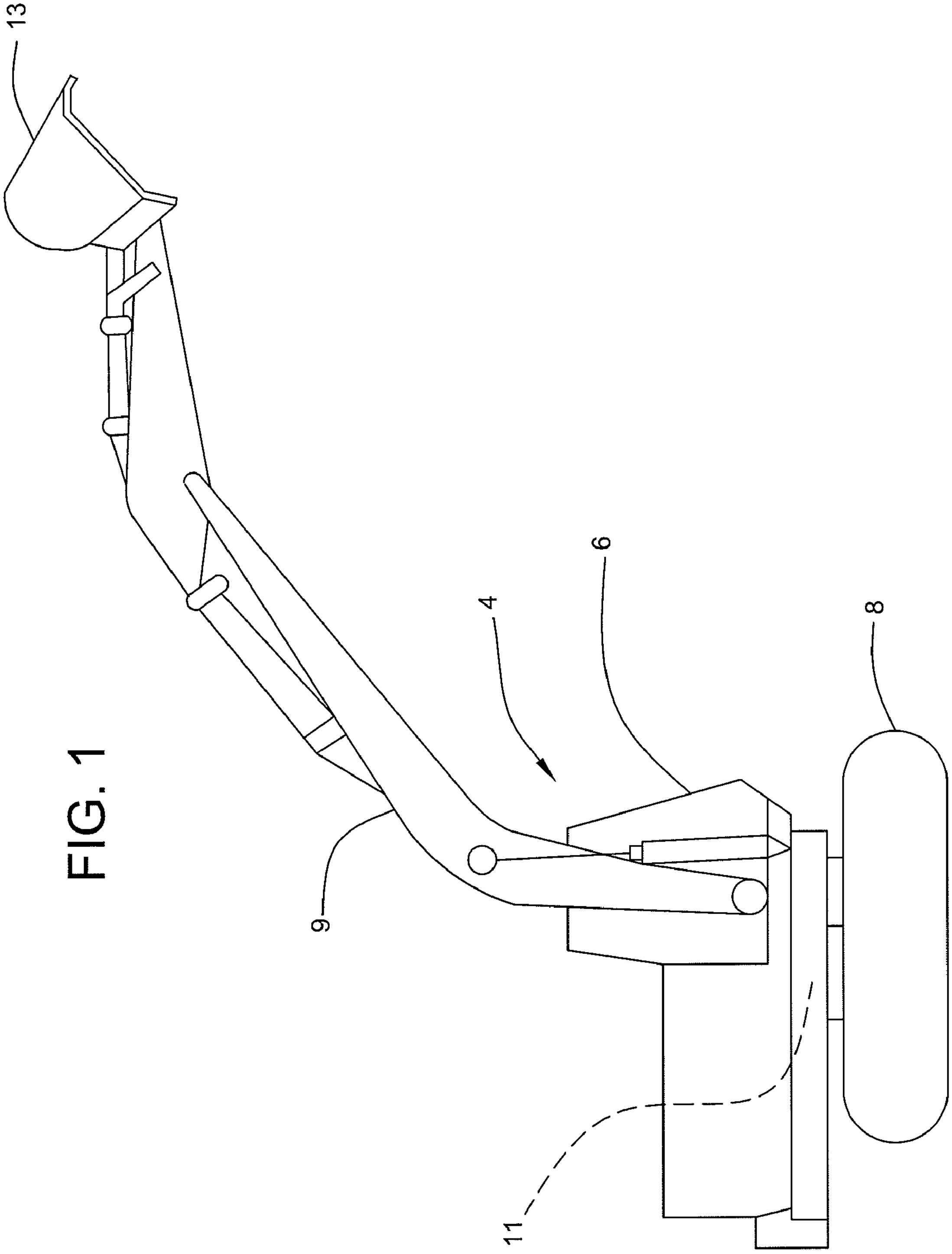
FIG. 1 is a side elevational view of an excavator.

FIG. 1 schematically illustrates a machine 4, such as a hydraulic excavator. The machine 4 includes an upper structure 6 that is rotatable relative to a base machine 8 about a central axis (not shown). The upper structure 6 rotates under the control of a swing motor 11. In the illustrated embodiment, the upper structure 6 includes a boom 9 extending therefrom that supports a work tool 13, in this case a bucket, as will be understood by those skilled in the art.

Figure 2:
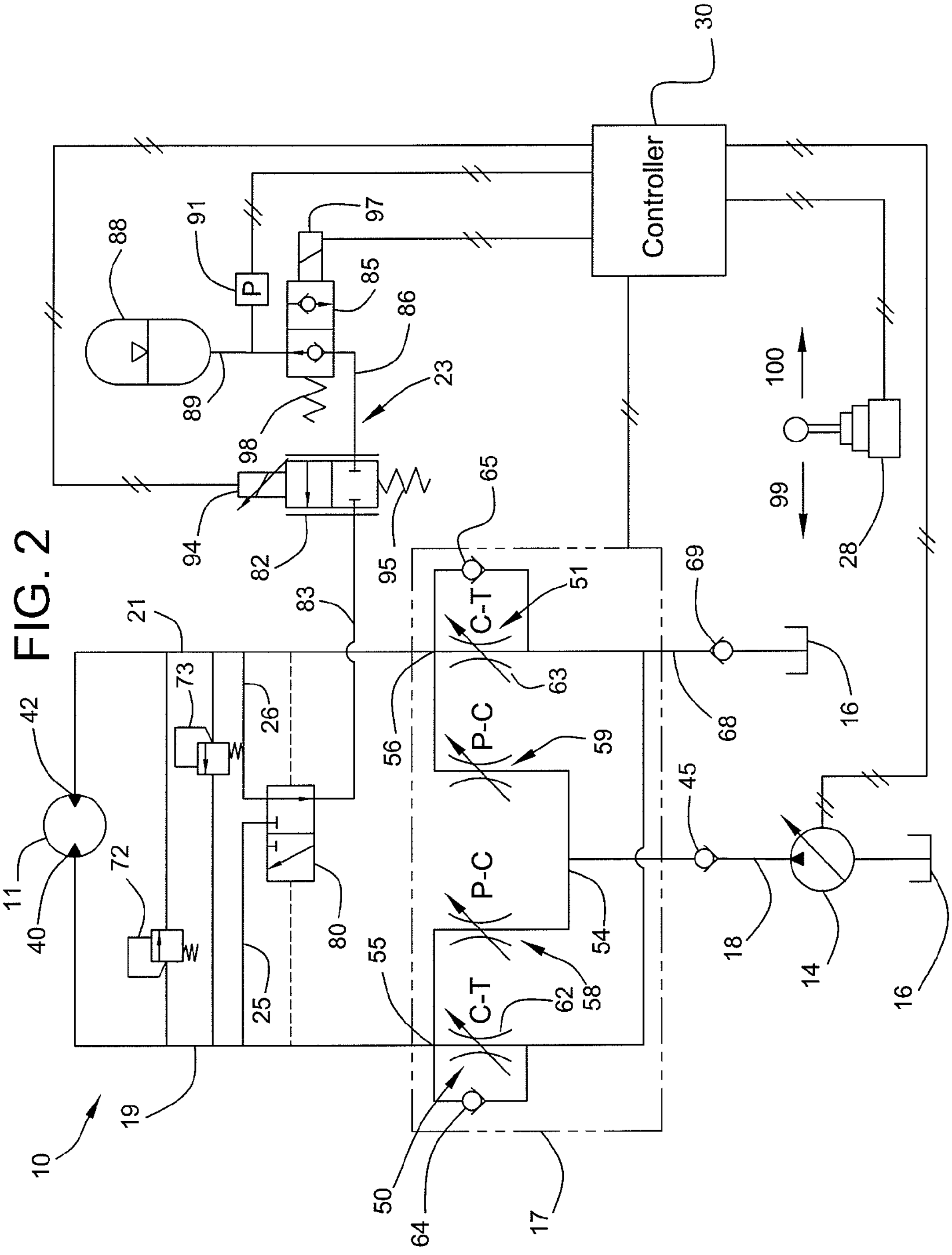
FIG. 2 is a schematic illustration of an embodiment of a hydraulic swing motor control system for recovering kinetic energy therefrom.

FIG. 2 illustrates a hydraulic circuit 10 adapted to control the hydraulic swing motor 11 adapted to drivingly rotate the upper structure 6 of the machine 4. The hydraulic circuit 10 can include a pump 14 connected to a tank 16, a control valve 17 connected to the pump 14 via a pump conduit 18, first and second motor conduits 19, 21 connecting the control valve 17 to opposite sides of the hydraulic swing motor 11, and an accumulator system 23. The accumulator system 23 is connected to the hydraulic swing motor 11 via first and second selector conduits 25, 26 which in turn are connected to the first and second motor conduits 19, 21, respectively. An operator input mechanism 28, or swing lever, can be provided to allow a user to operate the swing motor 11. Specifically, the operator input mechanism 28 is connected to a controller 30 adapted to receive input command signals from the operator mechanism 28. The controller 30 operates in a logical fashion to provide output control signals for adjusting the fluid applied to the swing motor 11.

In an embodiment, the swing motor 11 includes a first port 40 and a second port 42. The swing motor 11 can move in a first direction when a flow of hydraulic fluid flows into the swing motor 11 through the first port 40. The swing motor 11 can move in a second direction when a flow of hydraulic fluid flows into the swing motor 11 through the second port 42. The second direction is in opposing relationship to the first direction in an embodiment. In a further embodiment, the swing motor 11 can move the upper structure 6 in a clockwise direction (when viewed from above) when the swing motor 11 is operated in the first direction and a counterclockwise direction (when viewed from above) when the swing motor 11 is operated in the second direction.

The pump 14 can be any suitable pump and is shown as a variable displacement pump. The pump 14 can be adapted to selectively supply a flow of pressurized hydraulic fluid to the swing motor 11 through one of the first and second motor conduits 19, 21 via the control valve 17. The pump conduit 18 can have a one-way check valve 45 disposed therein to define a one-way flow path from the pump 14 to the control valve 17.

The control valve 17 can be hydraulically connected to the pump 14 and to the first and second motor conduits 19, 21. The control valve can be movable between a first open position, wherein a flow path between the pump 14 and the first port 40 of the swing motor 11 is defined, a second open position, wherein a flow path between the pump 14 and the second port 42 of the swing motor 11 is defined, and a closed position, wherein the pump 14 and the swing motor 11 are hydraulically blocked from each other.

The control valve 17 can be an independent metering valve (IMV) system that includes four independently-operated valves that can be considered to act as a flow divider 48 and a pair of throttle-check valves 50, 51. The flow divider 48 can have an inlet 54 hydraulically connected to the pump 14 via the pump conduit 18, a first outlet 55 hydraulically connected to the swing motor 11 via the first motor conduit 19, and a second outlet 56 hydraulically connected to the swing motor 11 via the second motor conduit 21. The flow divider of the control valve 17 can include first and second variable restrictors 58, 59. The first variable restrictor 58 can be disposed between the inlet 54 of the control valve 17 and the first outlet 55 thereof. The second variable restrictor 59 of the flow divider can be disposed between the inlet 54 of the control valve and the second outlet 56 thereof. The first variable restrictor 58 of the flow divider can define a variable pump to motor one-way flow path for the first port 40 of the swing motor 11. The second variable restrictor 59 of the flow divider can define a variable pump to motor cylinder one-way flow path for the second port 42 of the swing motor 11.

Each throttle-check valve 50, 51 can include a variable restrictor 62, 63 and a one-way check valve 64, 65. The first and second throttle-check valves 50, 51 are hydraulically connected to the tank 16. The first throttle check valve 50 and second throttle check valve 51 are connected in parallel to a tank conduit 68, which, in turn, is connected to the tank 16. A one-way check valve 69 can be disposed in the tank conduit 68 to help establish back pressure in the tank conduit 68.

The first throttle-check valve 50 can be hydraulically connected to the first motor conduit 19. The third variable restrictor 62 can be hydraulically connected to the first motor conduit 19 and to the tank 16 via the tank conduit 68. The one-way check valve 64 can be connected in parallel relationship with the third variable restrictor 62. The check valve 64 can be connected to the first motor conduit 19 and the tank 16 via the tank conduit 68 to define a one-way fluid flow path from the tank 16 through the check valve 64 to the swing motor 11 via the first motor conduit 19.

The second throttle-check valve 51 can be hydraulically connected to the second motor conduit 21. The fourth variable restrictor 63 can be hydraulically connected to the second motor conduit 21 and to the tank 16 via the tank conduit 68. The one-way check valve 65 can be connected in parallel relationship with the fourth variable restrictor 63. The check valve 65 can be connected to the second motor conduit 21 and the tank 16 via the tank conduit 68 to define a one-way fluid flow path from the tank 16 through the check valve 65 to the swing motor 11 via the second motor conduit 21.

The first throttle-check valve 50 can define a variable motor cylinder-to-tank one-way flow path for the first port 40 of the swing motor 11 with the check valve 64 providing an anti-cavitation feature for the swing motor 11. The second throttle-check valve 51 can define a variable motor cylinder-to-tank one-way flow path for the second port 42 of the swing motor 11 with the associated check valve 65 providing an anti-cavitation feature for the swing motor 11.

The control valve 17 can be electrically connected to the controller 30. The motor speed can be controlled using the control valve 17 to control the flow of hydraulic oil into the swing motor 11 from the pump 14. Each of the variable restrictors 58, 59, 62, 63 of the control valve 17 can be independently operated via the controller 30. In other embodiments, a solenoid-operated directional control valve as is known in the art can be used to control the flow of hydraulic oil from the pump 14 to the swing motor 11.

The first motor conduit 19 is hydraulically connected to the control valve 17 and to the first port 40 of the swing motor 11. The second motor conduit 21 is hydraulically connected to the control valve 17 and to the second port 42 of the swing motor 11. A pair of cross-line pressure relief valves 72, 73 can be provided to interconnect the motor conduits 19, 21 in the usual manner so that excessive pressure above a predetermined value in one of the first and second motor conduits 19, 21 is relieved to the other of the first and second motor conduits 19, 21.

The accumulator system 23 can included a selection valve 80 connected to the first and second motor conduits 19, 21, a modulation valve 82 connected in series to the selection valve 80 via a first accumulator conduit 83, an accumulator charge valve 85 connected in series to the modulation valve 82 via a second accumulator conduit 86, and a hydraulic accumulator 88 connected in series to the accumulator charge valve 85 via a third accumulator conduit 89. A pressure sensor 91 can be disposed between the accumulator charge valve 85 and the accumulator 88.

The selection valve 80 can be hydraulically connected to the first and second motor conduits 19, 21 and to the accumulator 88 (through the modulation valve 82 and the accumulator charge valve 85 as illustrated). The selection valve 80 can be a pressure-operated, directional control 2/2-way valve. The selection valve 80 can respond to the differential pressure between the first and second motor conduits 19, 21 such that the selection valve 80 opens a flow path between the first accumulator conduit 83 and the motor conduit having the greater relative pressure via the associated selector conduit.

The selection valve 80 can be movable between a first open position, wherein a flow path between the first port 40 of the swing motor 11 and the accumulator 88 is defined, and a second open position, wherein a flow path between the second port 42 of the swing motor 11 and the accumulator 88 is defined. The selection valve 80 can be disposed in the first open position when the pressure in the first motor conduit 19 is greater than the pressure in the second motor conduit 21. The selection valve 80 can be disposed in the second open position when the pressure in the second motor conduit 21 is greater than the pressure in the first motor conduit 19.

The modulation valve 82 can be a normally-closed proportional flow control valve. The modulation valve 82 can be hydraulically connected to the selection valve 80 and the accumulator 88 (through the accumulator charge valve 85 as illustrated). The modulation valve 82 can be disposed in series between the selection valve 80 and the accumulator 88. The modulation valve 82 can be disposed in series between the selection valve 80 and the accumulator charge valve 85. The modulation valve 82 can be variably movable over a range of travel between a fully open position, wherein a flow path between the first accumulator conduit 83 and the second accumulator conduit 86 is defined, and a fully closed position, wherein the first accumulator conduit 83 and the second accumulator conduit 86 are hydraulically blocked from each other.

Intermediate positions between the fully open position and the fully closed position can define a restricted flow path relative to the fully open position according to a relationship between the relative position of the modulation valve 82 with respect to the fully open position. The modulation valve 82 can be variably movable over a range of travel between a fully open position, wherein a flow path between the selection valve 80 and the accumulator 88 (through the accumulator charge valve 85 as illustrated) is defined, and a fully closed position, wherein the selection valve 80 and the accumulator 88 are hydraulically blocked from each other.

The modulation valve 82 can include a solenoid 94 and a spring 95. The solenoid 94 and the spring 95 can be adapted to move the modulation valve 82 over the range of travel between the fully open position and the fully closed position. In the illustrated embodiment, the spring 95 positions the modulation valve 82 in the fully closed position when the solenoid 94 is de-energized. The solenoid 94 of the modulation valve 82 can be electrically connected to the controller 30. The controller 30 can adjust the position of the modulation valve 82 based upon the pressure detected by the pressure sensor 91 associated with the accumulator 88, the pressure sensor 91 also being electrically connected to the controller 30. The pressure sensor 91 can be operably arranged with the accumulator 88 to sense the pressure within the accumulator 88.

The controller 30 can be adapted to receive a variable signal from the pressure sensor 91 with the signal being variable to indicate the pressure in the accumulator 88 sensed by the pressure sensor 91. The controller 30 can operate the solenoid of the modulation valve to position the modulation valve 82 based on the pressure sensed by the pressure transducer 91.

In certain embodiments, when the accumulator is undergoing a charging operation, the controller 30 can be adapted to maintain the modulation valve 82 in the fully open position while the pressure in the accumulator 88 is at or below a predetermined level. Once the pressure transducer 91 indicates that the pressure in the accumulator 88 exceeds the predetermined level, the controller 30 can position the modulation valve 82 in an intermediate position between the fully open position and the fully closed position based on the pressure sensed by the pressure transducer 91. Once the pressure transducer 91 senses that the pressure in the accumulator 88 is at a second predetermined level, which is higher than the first predetermined level, the controller 30 can position the modulation valve 82 in the fully closed position.

When the pressure in the accumulator 88 is between the first predetermined level and the second predetermined level, the controller 30 can position the modulation valve 82 in an intermediate position between the fully open and the fully closed position that corresponds to the pressure level in the accumulator 88 relative to the first and second predetermined levels. For example, if the pressure in the accumulator 88 is halfway between the first and second predetermined levels, the modulation valve 82 can be placed in an intermediate position that restricts the flow through the modulation valve 82 by a predetermined ratio when the modulation valve 82 is in the fully open position.

The accumulator charge valve 85 can be hydraulically connected to the selection valve 80 (through the modulation valve 82 as illustrated) and to the accumulator 88. The accumulator charge valve 85 can be disposed in series between the selection valve 80 and the accumulator 88. The accumulator charge valve 85 can be disposed in series between the modulation valve 82 and the accumulator 88.

The accumulator charge valve 85 can be movable between a first open position, or a charge position, wherein a one-way flow path into the accumulator 88 is defined, and a second open position, or a discharge position, wherein a one-way flow path out of the accumulator 88 is defined. When the accumulator charge valve 85 is in the charge position, a one-way flow path from the selection valve 80 through the modulation valve 82 to the accumulator 80 can be defined. When the accumulator charge valve 85 is in the discharge position, a one-way flow path from the accumulator 88 through the modulation valve 85 to the selection valve 80 can be defined.

The accumulator charge valve 85 can include a solenoid 97 and a spring 98. The solenoid 97 and the spring 98 of the accumulator charge valve 85 can be adapted to move the accumulator charge valve 85 between the first open position and the second open position. In the illustrated embodiment, the spring 98 positions the accumulator charge valve 85 in the charge position when the solenoid 97 is de-energized. The solenoid 97 of the accumulator charge valve 85 can be electrically connected to the controller 30. The position of the accumulator charge valve 85 can be a function of the operator swing motor lever 28, which is also electrically connected to the controller 30.

The accumulator charge valve 85 can be normally in the charge position as shown in FIG. 2 for swing motor deceleration. In some embodiments, the controller 30 can operate the solenoid 97 of the accumulator charge valve 85 to move the accumulator charge valve 85 to the discharge position when the user positions the operator input mechanism 28 in a position at or above a predetermined threshold that calls for the swing motor 11 to accelerate.

The operator input mechanism 28 can be located within the upper structure 6 of the machine 4, for example. The operator input mechanism 28 can be adapted to selectively indicate the direction and degree of swing motor operation. The direction can include the first and second directions of the swing motor 11, and the degree can include a range between a lower limit and an upper limit of swing motor operation. In one embodiment, the operator input mechanism 28 can be moved from a neutral position (as shown in FIG. 2) in a left direction 99 to indicate the first direction and from the neutral position in a right direction 100 to indicate the second direction. In one embodiment, the operator input mechanism 28 can be moved a predetermined amount from the neutral position to the left and to the right to a full left position and a full right position, respectively. Also, the rate of movement of the operator input mechanism 28, together with its direction, can be used to indicate the motor acceleration or deceleration.

The degree, or percentage, the operator input mechanism 28 is moved from the neutral position, either to the left or the right, can be used to indicate the degree of operation of the swing motor 11 (which can be expressed as a percentage of maximum allowed swing motor operation). In some embodiments, the operator can signal the swing motor 11 to operate at 100% allowed capacity in the first direction by moving the operator input mechanism 28 to the full left position. Similarly, the operator can signal the swing motor 11 to operate at 100% allowed capacity in the second direction by moving the operator input mechanism to the full right position. Intermediate positions between the full left position and the neutral position can indicate a correlating percentage of operation in the first direction. Intermediate positions between the full right position and the neutral position can indicate a correlating percentage of operation in the second direction.

The controller 30 can be electrically connected to the operator input mechanism 28 and the solenoid 97 of the accumulator charge valve 85. The controller 30 can be adapted to receive a variable signal from the operator input mechanism 28 with the signal variable to indicate the direction and degree of swing motor operation selected by the operator. The controller 30 can operate the solenoid 97 of the accumulator charge valve to place the accumulator charge valve 85 in one of the charge position and the discharge position based on the signal from the operator input mechanism 28 and/or another signal, such as motor pressure, for example. The controller 30 can be adapted to operate the IMV 17 (or in other embodiments, the directional control valve, for example) based on the input received from the operator input mechanism 28.

The controller 30 can place the accumulator charge valve in the discharge position once the operator calls for operation of the swing motor 11 within a predetermined amount of the full left position or the full right position. For example, in one embodiment, the controller 30 can place the accumulator charge valve 85 in the discharge position when the operator input mechanism 28 indicates a clockwise direction with a predetermined percentage, such as ninety percent, or more of the maximum allowed operation of the swing motor 11. Similarly, the controller 30 can place the accumulator charge valve 85 in the discharge position when the operator input mechanism 28 indicates a counterclockwise direction with a predetermined percentage, such as ninety percent, or more of the maximum allowed operation of the swing motor 11. Once the accumulator charge valve 85 is placed in the discharge position, the controller 30 can maintain it in the discharge position until the operator input mechanism 28 is placed at or below a predetermined range encompassing the neutral position. For example, the controller 30 can be adapted to maintain the accumulator charge valve 85 in the discharge position until the operator input mechanism 28 is in a position within twenty percent of the neutral position either from the left or from the right directions 99, 100.

In some embodiments, when the accumulator is undergoing a discharge operation, the controller 30 can be adapted to disable the accumulator discharge function when the pressure in the accumulator 88 is below a predetermined level, such as below a pressure level where the pressurized fluid in the accumulator would be close to empty. In such instances, the controller 30 can maintain the accumulator charge valve 85 in the charge position even though the operator input mechanism 28 is calling for the swing motor 11 to operate above the predetermined threshold.

In another aspect of the disclosure, a method for controlling a swing motor 11 can include a charging operation to convert the kinetic energy generated by the swing motor 11 into pressurized hydraulic fluid stored in the accumulator 88. In one embodiment, a flow of hydraulic fluid can be directed through the first motor conduit 19 into the first port 40 of the swing motor 11 and out of the second port 42 of the swing motor 11 into the second motor conduit 21 to move the swing motor 11 in the first direction. The flow of hydraulic fluid through the swing motor 11 into the first port 40 and out the second port 42 can be decelerated. A flow path can be provided from the second port 42 of the swing motor 11 to the accumulator 88 such that at least a portion of the flow of hydraulic fluid exiting the swing motor 11 from the second port 42 is directed into the accumulator 88.

The method for controlling a swing motor can include an accelerating operation, or a discharging operation, to use the pressurized hydraulic fluid stored in the accumulator 88 to accelerate the swing motor 11. In one embodiment, the flow of hydraulic fluid through the swing motor 11 into the first port 40 and out the second port 42 can be accelerated as needed. The flow path from the second port 42 of the swing motor 11 to the accumulator 88 can be blocked. A flow path can be provided from the accumulator 88 to the first port 40 of the swing motor 11 such that at least a portion of the flow of hydraulic fluid stored in the accumulator 88 flows through the swing motor 11 into the first port 40 and out the second port 42.

The accelerating operation can be used when the swing motor 11 is operated in the second direction, as well. In one embodiment, the flow of hydraulic fluid into the first port 40 of the swing motor 11 and out the second port 42 thereof can be blocked. A flow of hydraulic fluid can be directed through the second motor conduit 21 into the second port 42 of the swing motor 11 and out of the first port 40 of the swing motor 11 through the first motor conduit 19 to move the swing motor 11 in the second direction. The flow of hydraulic fluid into the second port 42 of the swing motor 11 and out the first port 40 can be accelerated as needed. A flow path from the accumulator 88 to the second port 42 of the swing motor 11 can be provided such that at least a portion of the flow of hydraulic fluid stored in the accumulator 88 flows through the swing motor 11 into the second port 42 and out the first port 40.

Similarly, the charging operation to convert the kinetic energy generated by the swing motor 11 into pressurized hydraulic fluid stored in the accumulator 88 can be used when the swing motor 11 is operated in the second direction, as well. In one embodiment, the flow of hydraulic fluid into the second port 42 of the swing motor 11 can be decelerated. The flow path from the accumulator 88 to the second port 42 of the swing motor 11 can be blocked. A flow path from the first port 40 of the swing motor 11 to the accumulator 88 can be provided such that at least a portion of the flow of hydraulic fluid exiting the swing motor 11 from the first port 40 is directed into the accumulator 88.

The charging operation and the discharging operations can be performed in repeated fashion alternately to fill the accumulator 88 with more pressurized fluid and increase the pressure in the accumulator 88 and to accelerate the swing motor 11 by discharging the pressurized fluid in the accumulator 88 through the swing motor 11 in the desired direction.

The method for controlling a swing motor can include an accumulator discharge blocking operation which can disable the discharging of the pressurized fluid in the accumulator 88 when the pressure in the accumulator 88 is below a predetermined level. In one embodiment, the flow of hydraulic fluid through the swing motor 11 into the first port 40 and out the second port 42 can be accelerated. The pressure of the hydraulic fluid stored in the accumulator 88 can be sensed. The flow path from the second port 42 of the swing motor 11 to the accumulator 88 can be blocked. A flow path from the accumulator 88 to the first port 40 of the swing motor 11 can be provided such that at least a portion of the flow of hydraulic fluid stored in the accumulator 88 flows through the swing motor 11 into the first port 40 and out the second port 42 when the pressure in the accumulator 88 exceeds a first predetermined pressure. The flow path from the accumulator 88 to the first port 40 of the swing motor 11 can be blocked when the pressure in the accumulator 88 is less than a second predetermined pressure, the second predetermined pressure being less than the first predetermined pressure.

The method for controlling a swing motor can include an accumulator charge blocking operation which can restrict and the charging of the pressurized fluid into the accumulator when the pressure in the accumulator is above a predetermined level and which can disable the charging of the accumulator when the pressure in the accumulator is above a second predetermined level, which is higher than the first predetermined level. In one embodiment, the pressure of the hydraulic fluid stored in the accumulator 88 can be sensed. The flow path from the swing motor 11 to the accumulator 88 can be restricted when the pressure in the accumulator 88 exceeds a first predetermined pressure. The flow path from the swing motor 11 to the accumulator 88 can be blocked when the pressure in the accumulator 88 exceeds a second predetermined pressure, the second predetermined pressure being higher than the first predetermined pressure.

INDUSTRIAL APPLICABILITY

The present disclosure is applicable to control a swing motor 11 of a machine 4, such as an excavator, for example. The swing motor 11 can be adapted to drivingly rotate the upper structure 6 of the machine 4 in either a clockwise direction or a counterclockwise direction. The accumulator 88 stores exit oil from the swing motor 11 that is pressurized by the inertia torque applied on the moving motor 11 via movement of the upper structure 6 of the excavator 13. The swing motor deceleration can be controlled via the accumulator 88. The supply of pressurized oil in the accumulator 88 can be reused to accelerate the swing motor 11 by supplying pressurized oil to the selected motor port 40, 42. The pressure-controlled selector valve 80 can be included to ensure that the accumulator 88 is connected to the appropriate side of the swing motor 11.

The advantages provided by the disclosed swing motor arrangement and method of operation will be appreciated upon consideration of the teachings herein. For example, the system and method enables recovery of kinetic energy generated by the operation of the swing motor through conversion thereof into hydraulic potential energy. The converted hydraulic energy may thereafter be reused for providing swing motor acceleration. It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A control circuit comprising:

a swing motor, the swing motor having a first port and a second port, the swing motor moving in a first direction when a flow of hydraulic fluid flows into the swing motor through the first port, the swing motor moving in a second direction when a flow of hydraulic fluid flows into the swing motor through the second port, the second direction being opposite to the first direction;

first and second motor conduits, the first motor conduit connected to the first port of the motor, the second motor conduit connected to the second port of the motor;

a pump adapted to selectively provide a flow of hydraulic fluid to the swing motor through the first and second motor conduits;

an accumulator system including a pressure-controlled selection valve and an accumulator, the selection valve hydraulically connected to the first and second motor conduits and to the accumulator and being movable between a first open position, wherein a flow path between the first port of the swing motor and the accumulator is defined, and a second open position, wherein a flow path between the second port of the swing motor and the accumulator is defined, the selection valve being disposed in the first open position when the pressure in the first motor conduit is greater than the pressure in the second motor conduit, and the selection valve being disposed in the second open position when the pressure in the second motor conduit is greater than the pressure in the first motor conduit; and an accumulator charge valve in series between the selection valve, the accumulator charge valve being movable between a first open position, wherein a one-way flow path towards the accumulator is defined, and a second open position, wherein a one-way flow path towards the selection valve is defined.

2. The control circuit according to claim 1, further comprising:

a control valve, the control valve hydraulically connected to the pump and to the first and second motor conduits, the control valve movable between a first open position, wherein a flow path between the pump and the first port of the swing motor is defined, a second open position, wherein a flow path between the pump and the second port of the swing motor is defined, and a closed position, wherein the pump and the swing motor are hydraulically blocked from each other.

3. The control circuit according to claim 2, wherein the control valve includes an inlet hydraulically connected to the pump, a first outlet hydraulically connected to the first motor conduit, a second outlet hydraulically connected to the second motor conduit, a first variable restrictor disposed between the inlet and the first outlet and a second variable restrictor disposed between the inlet and the second outlet.

4. The control circuit according to claim 3, further comprising:

a tank; wherein the control valve includes a third variable restrictor hydraulically connected to the first motor conduit and to the tank, a one-way check valve connected in parallel relationship with the third variable restrictor and connected to the first motor conduit and the tank to define a one-way fluid flow path from the tank through the check valve to the swing motor via the first motor conduit, and a fourth variable restrictor hydraulically connected to the second motor conduit and to the tank, a one-way check valve connected in parallel relationship with the fourth variable restrictor and connected to the second motor conduit and the tank to define a one-way fluid flow path from the tank through the check valve to the swing motor via the second motor conduit.

5. The control circuit according to claim 1, wherein the accumulator charge valve includes a solenoid and a spring, the solenoid and the spring of the accumulator charge valve adapted to move the accumulator charge valve between the first open position and the second open position, the control circuit further comprising:

an operator input mechanism adapted to selectively indicate the direction and degree of swing motor operation, wherein the direction includes the first and second directions of the swing motor, and wherein the degree comprises a range between a lower limit and an upper limit of swing motor operation; and a controller electrically connected to the operator input mechanism and the solenoid of the accumulator charge valve, the controller adapted to receive a variable signal from the operator input mechanism, the signal variable to indicate the direction and degree of swing motor operation selected by the operator, and to operate the solenoid of the accumulator charge valve to place the accumulator charge valve in one of the first open position and the second open position based on the signal from the operator input mechanism.

6. The control circuit according to claim 5, wherein the controller places the accumulator charge valve in the second open position when the operator input mechanism indicates a clockwise direction with a predetermined percentage or more of the range of motor operation or a counterclockwise direction with a predetermined percentage or more of the range of motor operation.

7. The control circuit according to claim 1, further comprising:

a pressure transducer operably arranged with the accumulator; and a modulation valve hydraulically connected to the selection valve and the accumulator, the modulation valve being in series between the selection valve and the accumulator, the modulation valve being variably movable over a range of travel between a fully open position, wherein a flow path from the selection valve to the accumulator is defined, and a fully closed position, wherein the selection valve and the accumulator are hydraulically blocked from each other;

wherein the position of the modulation valve is based upon the pressure detected by the pressure transducer.

8. The control circuit according to claim 7, wherein the modulation valve includes a solenoid and a spring adapted to move the modulation valve over the range of travel between the fully open position and the fully closed position, the control circuit further comprising:

a controller electrically connected to the pressure transducer and the solenoid of the modulation valve, and adapted to receive a variable signal from the pressure transducer to indicate the pressure in the accumulator sensed by the pressure transducer, and to operate the solenoid of the modulation valve, the controller positioning the modulation valve based on the pressure sensed by the pressure transducer.

9. The control circuit according to claim 1, further comprising:

a pressure transducer, the pressure transducer operably arranged with the accumulator; and a modulation valve hydraulically connected to the selection valve and the accumulator and being in series between the selection valve and the accumulator, and being variably movable over a range of travel between a fully open position, wherein a flow path from the selection valve to the accumulator is defined, and a fully closed position, wherein the selection valve and the accumulator are hydraulically blocked from each other;

wherein the position of the modulation valve is based upon the pressure detected by the pressure transducer.

10. The control circuit according to claim 9, wherein the modulation valve includes a solenoid and a spring, the solenoid and the spring of the modulation valve adapted to move the modulation valve over the range of travel between the fully open position and the fully closed position, and wherein the accumulator charge valve includes a solenoid and a spring, the solenoid and the spring of the accumulator charge valve adapted to move the accumulator charge valve between the first open position and the second open position, the control circuit further comprising:

an operator input mechanism adapted to selectively indicate the direction and degree of swing motor operation, wherein the direction includes the first and second directions of the swing motor, and wherein the degree comprises a range between a lower limit and an upper limit of swing motor operation; and a controller electrically connected to the operator input mechanism, the pressure transducer, the solenoid of the modulation valve, and the solenoid of the accumulator charge valve, the controller adapted to receive a variable signal from the pressure transducer to indicate the pressure sensed by the pressure transducer, and to operate the solenoid of the modulation valve to place the modulation valve in a position based on the pressure sensed by the pressure transducer, the controller being further adapted to receive a variable signal from the operator input mechanism, the variable signal to indicate the direction and degree of swing motor operation selected by the operator, and to operate the solenoid of the accumulator charge valve to place the accumulator charge valve in one of the first open position and the second open position based on the signal from the operator input mechanism.

11. A method for controlling a swing motor comprising:

directing a flow of hydraulic fluid through a first motor conduit into a first port of the swing motor and out of a second port of the swing motor into a second motor conduit to move the swing motor in a first direction;

decelerating the flow of hydraulic fluid through the swing motor into the first port and out the second port;

providing a flow path from the second port of the swing motor to an accumulator such that at least a portion of the flow of hydraulic fluid exiting the swing motor from the second port is directed to be stored in the accumulator;

sensing a pressure of the hydraulic fluid stored in the accumulator; and restricting the flow path from the second port of the swing motor to the accumulator when the pressure in the accumulator exceeds a first predetermined pressure.

12. The method for controlling a swing motor according to claim 11, further comprising:

accelerating by a predetermined amount the flow of hydraulic fluid through the swing motor into the first port and out the second port;

blocking the flow path from the second port of the swing motor to the accumulator; and providing a flow path from the accumulator to the first port of the swing motor such that at least a portion of the flow of hydraulic fluid stored in the accumulator flows through the swing motor into the first port and out the second port.

13. The method for controlling a swing motor according to claim 12, further comprising:

providing a flow path from the pump to the swing motor.

14. The method for controlling a swing motor according to claim 11, further comprising:

accelerating by a predetermined amount the flow of hydraulic fluid through the swing motor into the first port and out the second port;

sensing the pressure of the hydraulic fluid stored in the accumulator;

blocking the flow path from the second port of the swing motor to the accumulator;

providing a flow path from the accumulator to the first port of the swing motor such that at least a portion of the flow of hydraulic fluid stored in the accumulator flows through the swing motor into the first port and out the second port when the pressure in the accumulator exceeds a first predetermined pressure; and blocking the flow path from the accumulator to the first port of the swing motor when the pressure in the accumulator is less than a second predetermined pressure, the second predetermined pressure being less than the first predetermined pressure.

15. The method for controlling a swing motor according to claim 11, further comprising:

blocking the flow path from the second port of the swing motor to the accumulator when the pressure in the accumulator exceeds a second predetermined pressure, the second predetermined pressure being higher than the first predetermined pressure.

16. The method for controlling a swing motor according to claim 11, further comprising:

blocking the flow of hydraulic fluid into the first port of the swing motor and out the second port thereof;

directing a flow of hydraulic fluid through the second motor conduit into the second port of the swing motor and out of the first port of the swing motor through the first motor conduit to move the swing motor in a second direction, the second direction being in opposing relationship to the first direction;

accelerating by a predetermined amount the flow of hydraulic fluid into the second port of the swing motor and out the first port; and providing a flow path from the accumulator to the second port of the swing motor such that at least a portion of the flow of hydraulic fluid stored in the accumulator flows through the swing motor into the second port and out the first port.

17. The method for controlling a swing motor according to claim 16, further comprising:

providing a flow path from the pump to the swing motor.

18. The method for controlling a swing motor according to claim 16, further comprising:

decelerating the flow of hydraulic fluid into the second port of the swing motor;

blocking the flow path from the accumulator to the second port of the swing motor; and providing a flow path from the first port of the swing motor to the accumulator such that at least a portion of the flow of hydraulic fluid exiting the swing motor from the first port is directed into the accumulator.

19. The method for controlling a swing motor according to claim 18, further comprising:

accelerating by a predetermined amount the flow of hydraulic fluid into the second port of the swing motor and out the first port thereof;

blocking the flow path from the first port of the swing motor to the accumulator; and providing a flow path from the accumulator to the second port of the swing motor such that at least a portion of the flow of hydraulic fluid stored in the accumulator flows through the swing motor into the second port and out the first port.

* * * * *